Patented June 21, 1949

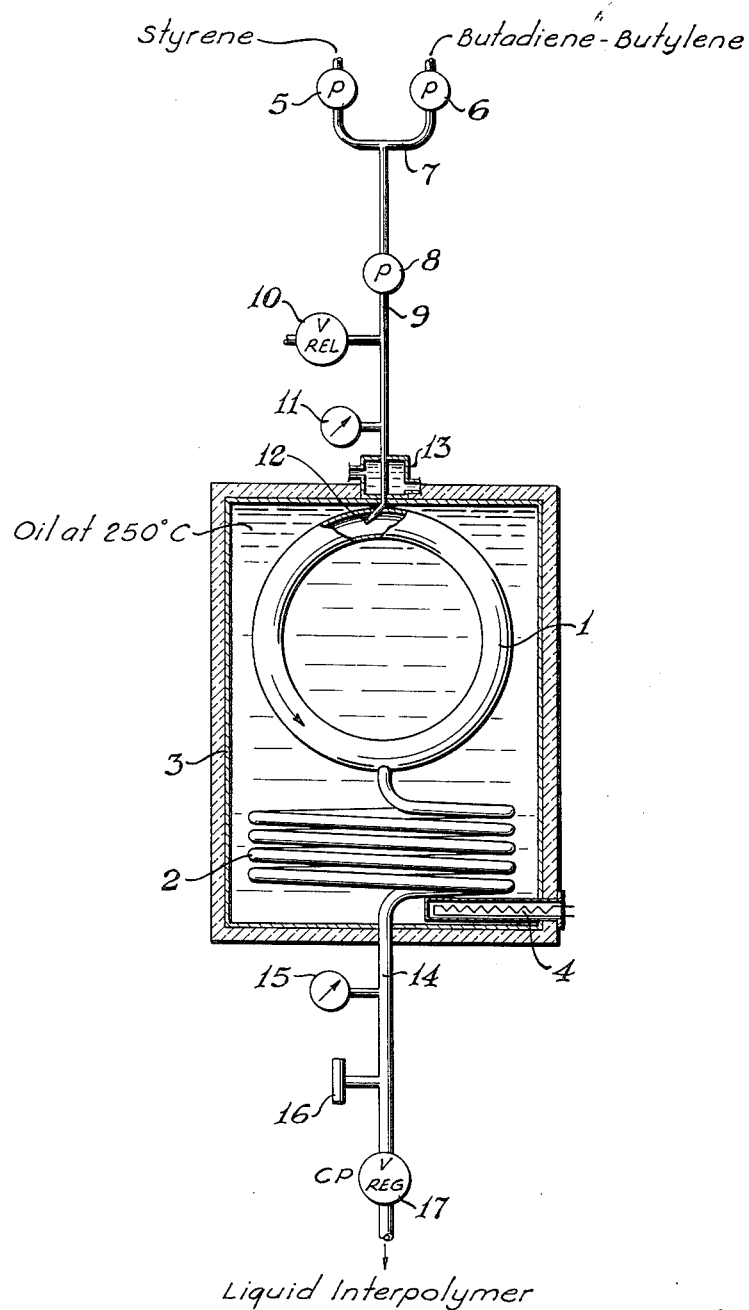

2,473,538

UNITED STATES PATENT OFFICE 2,473,538

LIQUID STYRENE-BUTADIENE INTERPOLYMERS

Otis R. McIntire, Midland, Mich., assignor to The Dow Chemical Company, Midland, Mich., a corporation of Delaware Application June 21, 1945, Serial No. 600,689

10 Claims. (Cl. 260—669)

This invention relates to the production of liquid styrene-butadiene interpolymers.

Styrene and butadiene have heretofore been copolymerized under a wide variety of conditions, but, so far as known, the products have in all cases been either rubbery materials or thermoplastic molding resins.

It has now been found, however, that liquid interpolymers can be prepared by heating a mixture of the monomers of styrene and butadiene, of which the styrene represents from 40 to 85 per cent by weight, in a closed vessel at a temperature of at least 235° C.

These interpolymers are viscous, water-white to yellowish oily liquids having specific gravities of about 0.9. They are largely non-volatilizable, although a minor proportion of material can be driven off by prolonged heating at low pressure. The new interpolymers harden slowly on exposure to air, and have shown promise as substitutes for a part of the drying oil in paint vehicles. When mixed with one to ten per cent by weight of sulfur chloride, they vulcanize or set rapidly, even at room temperature, to a resin having excellent electrical properties. They are also effective as vulcanizable plasticizers for synthetic elastomers.

In a preferred method of making the new interpolymers, the two monomers are mixed together, usually under a sufficient pressure that the butadiene is liquid. The mixture is then introduced into a confined zone and there maintained at a temperature between 235° and 275° C. for a time sufficient to form the desired liquid interpolymer, 0.5 hour usually being sufficient. Prolonged heating is not disadvantageous, but times over about 2 hours are rarely used. The heated mixture is then withdrawn from the confined zone and cooled. The resulting liquid may contain a small proportion of readily volatile unpolymerized material, which may be removed, if desired, by heating, e. g. to 150° C. at atmospheric pressure, to vaporize the volatile material, leaving the interpolymer as a residue.

The relative proportions of styrene and butadiene in the reactant mixture may, as stated, be varied within the range of about 40 to about 85 per cent by weight of styrene in the combined monomers. In general, styrene concentrations of 50 to 70 per cent give the most satisfactory interpolymers. When more than 85 per cent of styrene is present, the interpolymers are extremely viscous and their vulcanizates are somewhat brittle. On the other hand, when less than about 40 per cent of styrene is present, the polymerized product is no longer a viscous liquid, but is a suspension of solid particles in a thin green-colored oil.

The temperature of polymerization must be at least about 235° C. in order to secure a liquid interpolymer. Desirable viscous liquids may be obtained up to about 275° C. In general, an average operating temperature of 250° C. is preferred. Since some polymerization of the mixture to solid products may occur at the lower temperatures which obtain while the mixture is being heated to the operating temperature, it is desirable to shock-heat the mixture from room temperature to at least 235° C. with great rapidity. Such shock-heating is best achieved by continuously injecting a small stream of the mixture to be polymerized into a large circulating body of material which is already undergoing polymerization at the desired temperature. The contact of the entering stream with the body of hot fluid heats it very rapidly and effectively. Formation of solid interpolymers is almost entirely prevented.

The pressure at which the polymerization is carried out may be varied within considerable limits. Since the reaction takes place in all cases above the critical temperatures of the monomers, the function of applied pressure is primarily to control the densities of the reactants. Pressures of at least 15 atmospheres are ordinarily most suitable, with 35 to 100 atmospheres being a good working range. At extreme pressures, over say 150 atmospheres, there is some tendency for the formation of solid interpolymers. Pressures within the desired range may be readily achieved merely by introducing the liquid monomers into a closed vessel and then heating to the polymerizing temperature.

While the desired interpolymers may be formed from a mixture of the two pure monomers, advantageous results are realized by carrying out the polymerization in the presence of a non-polymerizing fluid diluent chemically inert to the monomers and the interpolymer. Such a diluent serves as a heat-exchange medium within the polymerizing mass and prevents localized overheating such as otherwise sometimes occurs in the autocatalytic polymerization of comparatively large masses. Aromatic and aliphatic hydrocarbons fluid at reaction temperatures are the preferred diluents, and should in general be present in a proportion of at least 20 per cent by weight of the mixture of monomers. Such diluents are easily removed from the interpolymers after its formation by heating the mixture to drive off the diluent as a vapor. Crude butylene, i. e. the mixture of butylenes derived from the pyrolysis of paraffin hydrocarbons, is a particularly effective diluent since it is freely fluid at reaction temperatures and flash-vaporizes from the polymerized product as soon as the pressure is released.

The monomeric styrene and butadiene used may be either pure materials or such mixtures thereof with other hydrocarbons as are produced in various industrial processes. A particularly convenient procedure is to mix commercially pure styrene with the crude mixture of butadiene and butylenes in roughly equal proportions which is available in large quantities as a still cut from the pyrolysis of fuel oils. Such a mixture is comparatively cheap and already contains the inert diluent which is desirable for the polymerizing reaction.

The formation of the styrene-butadiene liquid interpolymers is ordinarily carried out without catalysts. However, polymerization catalysts, such as benzoyl peroxide in a proportion of 0.1 to 1.0 per cent by weight of the monomer mixture, may be added to accelerate the polymerization.

The invention may be further explained with reference to the accompanying drawing, which illustrates diagrammatically one form of apparatus for continuous interpolymerization.

In the apparatus shown, polymerization is carried out in a system comprising a closed pipe loop 1 from the bottom of which extends a coil 2 of smaller pipe. The loop and coil are enclosed in a thermally insulated container 3 which is filled with oil maintained at 250° C. by an immersed electric heater 4.

Styrene and a butadiene-butylene mixture to be interpolymerized are withdrawn from separate liquid storage systems by metering pumps 5 and 6 which forward the monomers in predetermined proportion into a mixing Y and thence into an adjustable high-pressure pump 8 capable of delivering a pressure of at least 100 atmospheres. This pump forces the mixture into a header 9 into which are connected a safety valve 10 and a pressure gage 11 and from there through a fine jet nozzle 12 which discharges tangentially into the loop 1, the rear portion of the nozzle being fitted with a cooling jacket 13 to prevent premature heating of the mixture.

The polymerized mixture leaving the coil 2 enters a header 14 outside the container 3 provided with a pressure gage 15 and a safety blow-off 16. This header terminates in a pressure-regulating bleed valve 17 from which the polymerized mixture issues as product and is collected.

In operation of the apparatus illustrated, the pumps 5 and 6 are regulated to supply the styrene and the butadiene-butylene mixture in such proportions that the styrene represents from 50 to 70 per cent of the total polymerizable materials present. The pump 8 and bleed valve 17 are adjusted to maintain the system at a steady pressure between 35 and 100 atmospheres and to allow a slow continuous flow of material through the system. The volume rate of flow should preferably not exceed 3 per cent per minute of the total volume of material undergoing polymerization in the system. In this way, the time of heating of the mixture is controlled at a minimum of slightly more than 0.5 hour. The action of the monomeric mixture issuing from the jet 12 maintains the body of hot fluid in the loop 1 in steady circulation, and the entering mixture is almost instantly shock-heated to reaction temperature by mixing with the much larger mass of hot fluid. As the polymerized mixture escapes from the relief valve 17, the butylene diluent flash-vaporizes, leaving a viscous liquid styrene-butadiene interpolymer.

The following examples will further illustrate the invention:

Example 1

A mixture of equal parts by weight of styrene and butadiene monomer was sealed in a closed container and heated at 250° C. for 2 hours. The container was then cooled and opened. There was obtained a water-white viscous liquid interpolymer of styrene and butadiene.

Example 2

A mixture of 1 part of styrene and 2 parts of a mixture of butadiene and butylenes derived as a still cut from the pyrolysis of fuel oil and containing about 50 per cent of butadiene was polymerized in a closed vessel at 250° C. for 2 hours. The vessel was cooled and opened, and the butylenes were allowed to vaporize and escape. The resulting product appeared to be identical with that of Example 1.

Example 3

A continuous polymerization was carried out in the apparatus shown in the drawing, in which the loop 1 was constructed of four standard 90-degree bends of 2-inch extra-heavy steel pipe welded together, and in which the coil 2 was formed of a 21-foot length of ¾-inch stainless steel pipe. The oil in the reservoir 3 was maintained at 250° C. Styrene and a butadiene-butylene mixture similar to that of Example 2 were pumped into the loop at rates such that the styrene represented 60 per cent by weight of the combined polymerizable monomers. The total volume rate of flow was about 0.9 gallon per hour, and the pressure in the system was held roughly constant at 1000 pounds per square inch. A water-white to yellowish liquid interpolymer of styrene and butadiene was obtained.

What is claimed is:

1. The method which comprises heating a solely hydrocarbon mixture consisting essentially of the monomers of styrene and butadiene of which the styrene represents from 40 to 85 per cent by weight at a temperature from 235° C. to 275° C. in a closed vessel for a time sufficient to produce a viscous liquid interpolymer.

2. A process according to claim 1 wherein the polymerization is carried out in the presence of a non-polymerizing fluid diluent chemically inert to the monomers and the interpolymer.

3. A process according to claim 1 wherein the polymerization is carried out in the presence of a polymerization catalyst in a proportion of 0.1 to 1.0 percent by weight of the monomer mixture.

4. A process according to claim 3 wherein the catalyst is benzoyl peroxide.

5. The method which comprises heating in the absence of a catalyst a mixture consisting of the monomers of styrene and butadiene of which the styrene represents from 40 to 85 per cent by weight at a temperature from 235° C. to 275° C. in a closed vessel for a time sufficient to produce a viscous liquid interpolymer.

6. The method which consists in heating a solely hydrocarbon mixture consisting essentially of the monomers of styrene and butadiene in which the styrene represents from 50 to 70 per cent by weight of such monomers in a confined zone at a temperature between 235° and 275° C. and under a pressure of from 35 to 100 atmospheres for a period of at least 0.5 hour, and thereafter withdrawing the heated material from the confined zone and recovering a viscous liquid styrene-butadiene interpolymer therefrom.

7. A process according to claim 6 wherein the temperature is about 250° C.

8. A process according to claim 6 wherein the polymerization is carried out in the presence of butylene in the proportion of at least 20 per cent by weight of the mixture of monomers.

9. The continuous process which consists in introducing a stream of a liquid solely hydrocarbon mixture consisting essentially of the monomers of styrene and butadiene in which the styrene represents from 50 to 70 per cent of the monomers into a confined zone maintained at a pressure of from 35 to 100 atmospheres and therein injecting it into a circulating liquid body of previously introduced mixture maintained at a temperature of 235° to 275° C., and continuously withdrawing a stream of liquid from the zone and recovering therefrom a viscous liquid interpolymer of butadiene and styrene, the volume rates of said introduction and withdrawal not exceeding 3 per cent per minute of the volume of the liquid body in the heated zone.

10. A process according to claim 9 wherein the polymerization is carried out in the presence of butylene in the proportion of at least 20 percent by weight of the mixture of monomers.

OTIS R. McINTIRE.

REFERENCES CITED

The following references are of record in the file of this patent:

UNITED STATES PATENTS

| Number | Name | Date |
|---|---|---|
| 2,168,271 | Perquin et al. | Aug. 1, 1939 |
| 2,252,333 | Rothrock | Aug. 12, 1941 |

FOREIGN PATENTS

| Number | Country | Date |
|---|---|---|
| 545,765 | Great Britain | June 11, 1942 |

OTHER REFERENCES

Alder et al., Berichte, vol. 71, 379–84 (1938).